Figure 13:
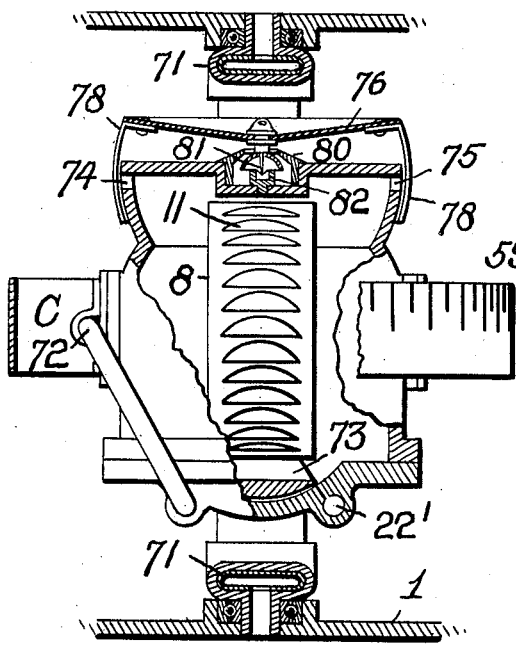

Nov. 8, 1938.　　　J. B. PETERSON　　　2,135,552
GYRO MAGNETIC COMPASS
Filed Jan. 22, 1934　　　3 Sheets-Sheet 1
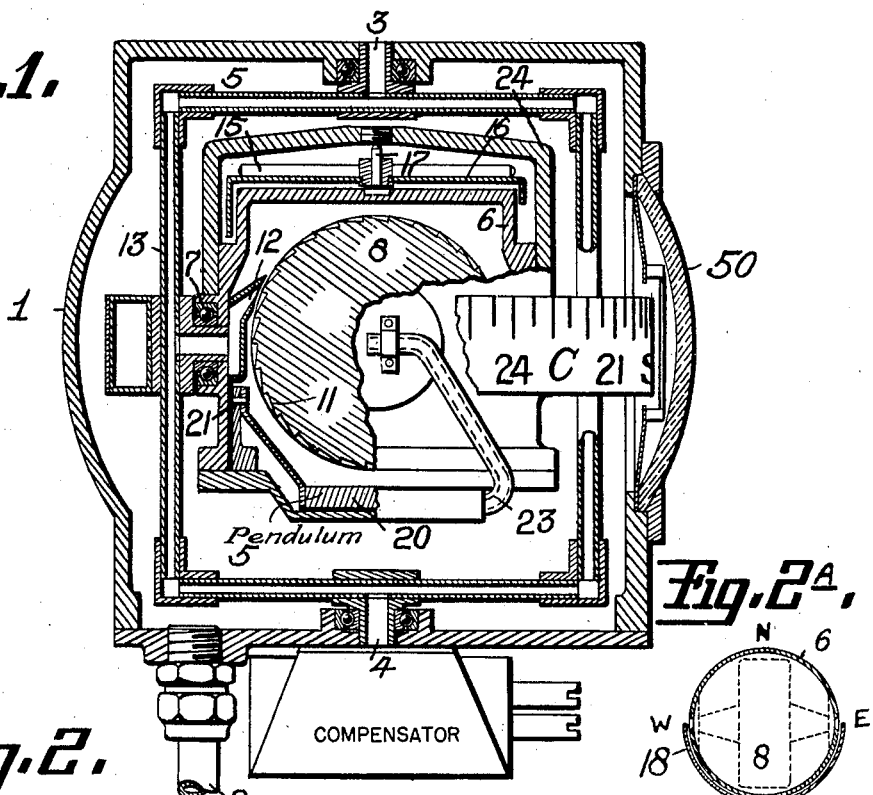
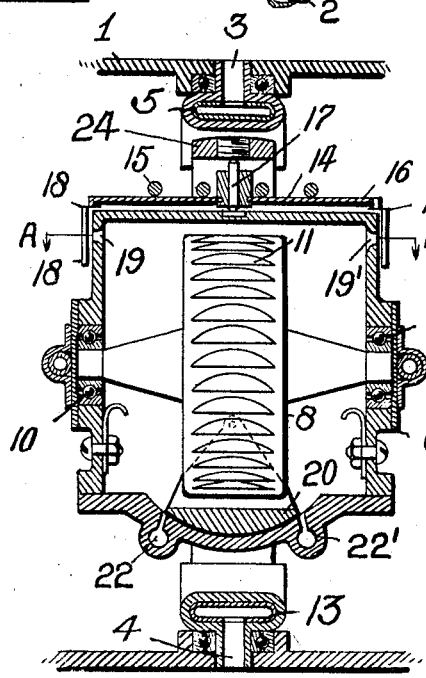
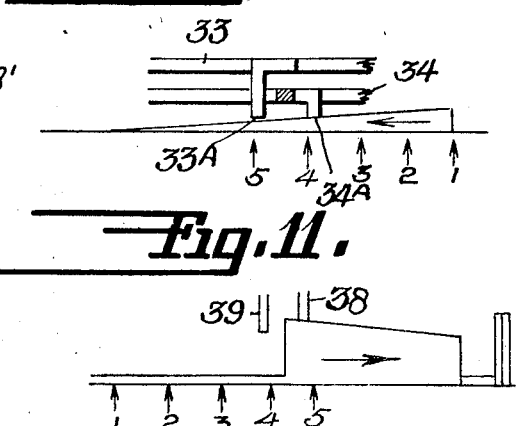

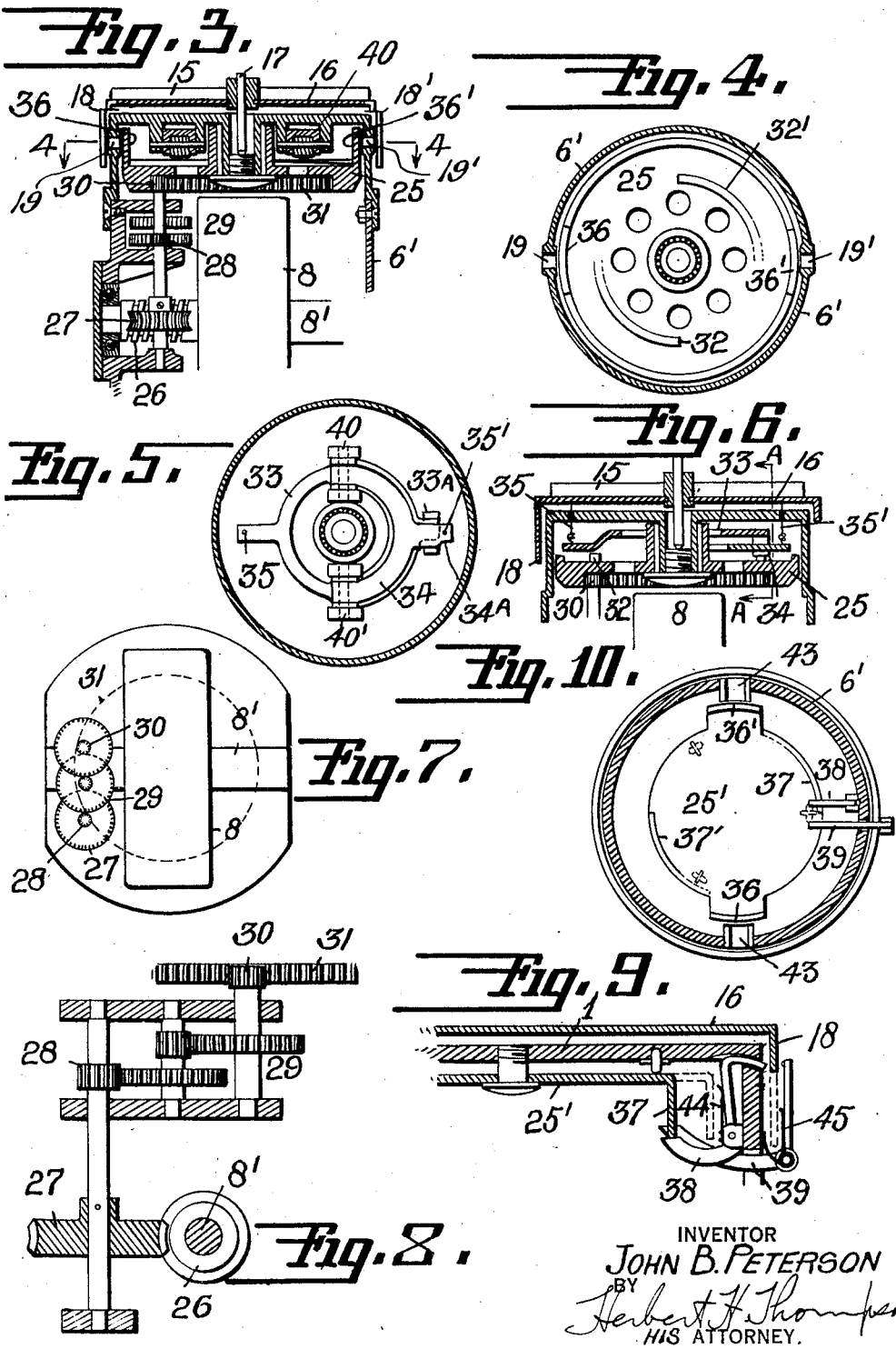

Nov. 8, 1938.   J. B. PETERSON   2,135,552
GYRO MAGNETIC COMPASS
Filed Jan. 22, 1934   3 Sheets-Sheet 3

INVENTOR
JOHN B. PETERSON
BY Herbert H. Thompson
HIS ATTORNEY.

Patented Nov. 8, 1938

2,135,552

UNITED STATES PATENT OFFICE 2,135,552

GYRO MAGNETIC COMPASS

John B. Peterson, Bethesda, Md.

Application January 22, 1934, Serial No. 707,752

14 Claims. (Cl. 33—222)

(Granted under the act of March 3, 1883, as amended April 30, 1928; 370 O. G. 757)

This invention relates to an improved combined magnetic compass and directional gyroscope in which the advantages of both are retained and the inherent difficulties largely overcome. The directional gyroscope as now constructed will maintain a uniform direction for a limited period of time regardless of the maneuvers or behavior of the aircraft but is subject to slow wandering so that it cannot be employed indefinitely as a compass. The magnetic compass, on the other hand, on aircraft gives a fairly correct average indication of the position of the magnetic meridian but is subject to violent temporary deviations due to rapid turning of the aircraft, rolling, pitching and other motions. I propose to overcome these difficulties by mounting a magnetic compass needle directly on a directional gyroscope and to control the position of the latter in azimuth by the average position of the former. By so mounting the magnetic compass, I secure the additional advantage that the needle is stabilized about at least one axis so that it is not subject to disturbance due to intercardinal rolling.

In the accompanying drawings an illustrative general structure with which the improvements of my invention may be combined, and which is not claimed herein per se, is shown in Figs. 1, 2 and 2a; while the improvements, for clarity, are segregated in Figs. 3 to 15.

Figure 12:
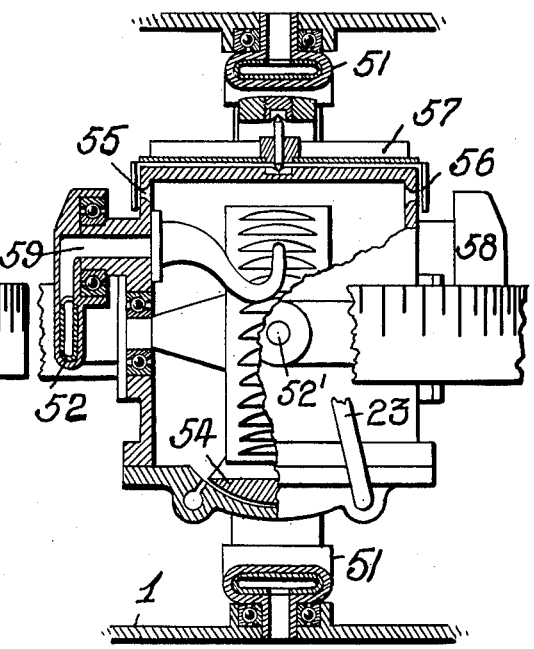
Figure 14:
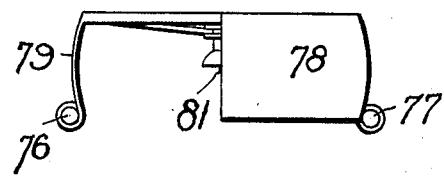
Figure 15:
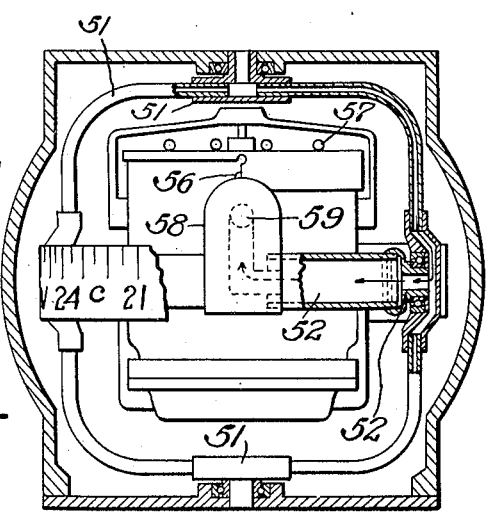

In these drawings Figs. 1, 2 and 2A are respectively a vertical section partly in elevation, a second vertical section at right angles to the first, and a horizontal section, in a preferred form of the gyromagnetic compass structure not claimed per se herein, but illustrative of such structures generally, and set forth herein for completeness of disclosure, the section of Fig. 2A being taken on the line A—A of Fig. 1;

In Figs. 3 to 8, showing the application of controlling means of my invention to such a gyromagnetic compass structure, Fig. 3 is a section like that of Fig. 1, and with reference to Fig. 3, Fig. 4 is a section on line 4—4, Fig. 5 a section slightly thereabove, Fig. 6 a vertical section at right angles thereto, and Figs. 7 and 8, plan and detail views, respectively, of the gearing therein;

Fig. 6a is a vertical section taken on line A—A of Fig. 6;

In Figs. 9 to 11, showing a further modified form of the controlling means, Fig. 9 is a sectional detail and Fig. 10 a horizontal section, while Fig. 11 is a diagram illustrating the operation thereof;

In Figs. 12 and 15, showing a pendulous control comprised in the invention, Fig. 12 is a vertical section partly in elevation, and Fig. 15 a similar view at right angles to Fig. 12;

And finally in Figs. 13 and 14, showing a further modified controlling means contemplated by my invention, Fig. 13 is a vertical section partly in elevation and Fig. 14 is a side elevation of the magnetic elements thereof.

Describing first the illustrative gyromagnetic compass structure not claimed herein but necessarily set forth for completeness of disclosure, in Figs. 1 and 2, the instrument is shown as enclosed within an air-tight casing 1 from which air is withdrawn through tube 2, this construction being the usual method of driving directional gyroscopes. Within said casing there is journalled on vertical trunnions 3 and 4 a vertical ring or framework 5 which supports the rotor bearing casing 6 on horizontal trunnions 7. Within said rotor bearing frame the rotor 8 is shown as journalled in horizontal bearings 9 and 10. The rotor is shown as air spun by means of buckets 11 in the periphery thereof against which a jet of air from nozzle 12 is directed. Air may be led to said nozzle through the hollow trunnion 7 which communicates with the interior of the flat tubing 13 which makes up the vertical ring, said tubing communicating at top and bottom with the hollow trunnions 3 and 4 which are open to the atmosphere.

On top of said rotor bearing casing 6 is mounted a magnetic element 14 which is shown as comprising a plurality of bar magnets 15 secured to a disc 16 rotatably mounted by means of a central pin 17 in upper and lower bearings between the top of casing 6 and a U-shaped member 24 on casing 6. For controlling the gyroscope from the magnetic element there are shown shutters 18, 18' depending from the magnetic element on opposite sides of the casing 6. Said casing preferably encloses the gyro wheel and has therein ports 19 and 19' adjacent said shutters. It will readily be seen that the pressure within said casing 6 is greater than that in the outer casing 1 so that the used air will discharge through said ports. If said shutters 18, 18' normally lie adjacent said ports or normally equally partially close the same from the same side (Fig. 2A), it will readily be seen that no torque will be exerted about the horizontal axis of the gyroscope. In case, however, of relative turning of the magnetic and gyro elements, an unbalanced torque will be set up about said horizontal axis causing the gyro to precess in azimuth until it synchronizes with the magnetic element. Said torque may be made small so that the gyroscope will be substantially unaffected by temporary deviations of the magnetic needle.

It is a further function of the gyroscope to stabilize a two-pivot magnetic element about the east-west horizontal axis so that its axis of rotation or pivoted shaft will remain in the (magnetic) north-south vertical plane. Thus the gyroscope will function to (1) stabilize the magnetic element and (2) to follow and average the azimuth position of the magnetic element. To prevent the gyroscope from assuming an inclination there is shown a pendulum 20 suspended from pivots 21 within casing 6 and so shaped as to normally partially cover or lie adjacent the second pair of ports 22, 22' leading without the casing 6. The air from said ports is shown as carried upwardly through tubes 23 so as to discharge along the horizontal axis of the gyroscope and exert a torque around the vertical axis without exerting any torque around the horizontal axis. The compass card C is shown as attached to the vertical ring 5 and is read through window 50.

An important improvement in my invention is shown in Figs. 3 to 7 inclusive. To avoid any disturbing reaction of the air jets 19, 19' on the magnetic element, I contemplate providing a means for alternately coupling and releasing the magnetic element from the gyro element and simultaneously rendering operative and inoperative the horizontally directed air jets. Thus the air jets may be made operative only at the time the magnetic element is locked to the gyroscope so that no disturbing effect will result. Such an arrangement allows the timing of the interval during which the magnetic element is released to equal one quarter of the period of complete oscillation of the magnetic element. By selecting this period the magnetic element will always be clutched or locked very close to the meridional position.

For accomplishing this purpose, I propose to slowly rotate a cam disc 25 mounted in the upper portion of the gyro casing 6'. Said disc is shown as rotated from the shaft 8' of the gyro rotor 8, said shaft being shown as provided with a worm 26 driving a worm wheel 27, the shaft of which drives a pinion 28 driving a double reduction gear train 29 (Fig. 8), the output of which drives a pinion 30 which meshes with an interior gear 31 formed in a downward extension of the cam disc 25. On the upper surface of said disc 25 are placed one or more cam surfaces 32, 32'. Said surfaces engage the under surfaces or projections therefrom of a pair of hinged levers 33 and 34 (Fig. 5), each of which has adjacent its outer end a small pin or wire 35, 35' extending upwardly through holes in the top of casing 6 and adapted to engage, when raised, the under surface of the magnetic element 16. Obviously, when either or both of said wires touch the magnetic element, the latter will be coupled to the gyroscope and when both wires are lowered, the magnetic element will be free.

Lever 33 extends both north and south of the center line and is pivoted about a horizontal east-west axis 40—40' on the center line. It is operated by a downward projecting member 33A which makes contact with the cam on the north side. The south side carries the clutch pin or wire 35.

Lever 34 extends only to the north of the center line and is also pivoted about a horizontal east-west axis 40—40' on the center line. It is operated by a downward projecting member 34A which makes contact with the cam on the north side. An extension on the north side carries the clutch pin 35'. Lever 33 does not engage the cam on the south side. Two cams are shown but only one is used at a time, the one which happens to be on the north side.

The cam disc also carries two upstanding ears, 36 and 36' (Fig. 10) which cover ports 19 and 19' so as to cut off the air supply thereto at regular intervals. In the particular design shown, assuming that the cam disc makes one revolution per minute, the air supply to ports 19 and 19' will be interrupted twice per minute, each interruption having a duration of four seconds (for example).

The purpose of this periodic interruption of the air supply to the jets is to free the magnetic element of any side thrust from the ports 19 and 19' which might cause sufficient pivot friction to prevent its rotation to the true magnetic meridian. Further, to ensure that the relative positions of the gyroscope casing and the magnetic element will remain fixed during the time the air jets are operative the mechanical clutch above described is provided. As a further advantageous feature of the mechanical clutch any possible disturbance of the magnetic element at the time the ports are partly covered by vanes 36 and 36' is avoided. As a further advantage the mechanical clutching allows accurate timing of the interval during which the magnetic element is free to rotate, to equal one-quarter the time of one complete period of the magnetic element. With this adjustment, if the magnetic element should happen to be at some position other than on the true magnetic meridian at the time it is set free, it will rotate to the true magnetic meridian in a time equal to one-quarter the period and will be clutched there during the next operative period of the air jets.

The clutch levers 33 and 34 are operated by cam surfaces 32 and 32' so that the magnetic element is set free to rotate about the axis 17, preferably one second after the air supply has been interrupted, remains free for a period of preferably two seconds where the magnetic element has a period of 8 seconds and is then clutched to the gyroscope casing during the next operative period of the air jets.

The operation of the clutch levers will now be explained in detail. Both levers are pivoted about the horizontal east-west axis 40—40'. Clutch wire 35 carried by lever 33 normally clutches the magnetic element, except where lifted and disengaged by contact of surface 33A with one of the two cams. Clutch wire 35' carried by lever 34 is normally free of the magnetic element except when lifted and engaged by contact of surface 34A with one of the two cams. As shown on the drawings the force of gravity may be depended upon to drop the lever when its downward operating projection reaches the end of the cam, that is position 4 for lever 34 and position 5 for lever 33, (Fig. 6A).

Referring to Fig. 6A, the operation of the clutch may be visualized by moving the cam plate to the left as indicated by the arrow. When the cam is in position 1 as shown, both clutch levers 33 and 34 are down, that is, not raised by the inclined cam. In this position the magnetic element is clutched by the cross lever 33 while the lever 34 carrying the clutch wire 35' is disengaged. When the end of the cam reaches position 2, lever 34 is raised and both clutch wires engage the magnetic element. Proceeding to position 3, lever 33 is raised, disengaging its contact wire 35. These operations, on positions 2 and 3 do not require accurate adjustment. It is only necessary that the first clutching operation by lever 34 be effected before lever 33 is declutched.

Between positions 3 and 4 the magnetic element is clutched by lever 34 only. At position 4 lever 34 drops and the magnetic element is free to rotate and seek the magnetic meridian. At position 5 lever 33 drops, clutching the magnetic element. The releasing and clutching operations at 4 and 5 respectively are definite and sharp, and should remain so without delicate adjustment of the parts.

In my invention, a caging or setting device, such as used on directional gyroscopes, may be unnecessary, especially if the magnetic element is allowed to reset itself frequently. This may be accomplished by increasing the speed of the cam disc and varying the angle covered by the air jet vanes 36, 36'.

It may be found to be impossible to keep the interval during which the magnetic element is free, exactly equal to one-quarter period, because (1) the speed of the gyroscope will vary, (2) the horizontal magnetic field strength is different for different parts of the earth causing the period of the magnetic element to vary, and (3) the tilting of the axis of the magnetic element to the north or south will place the magnetic element in a component of stronger or weaker magnetic field strength, thereby causing the period to vary, but it is believed that satisfactory operation will be obtained if the free-interval period is not less than ⅛ and not more than ⅜ the period of the compass, (approximately).

A further modification is shown in Figs. 9 and 10. According to this form the rotatable cam disc 25' is provided with two pairs of downwardly turned edges 37 and 37' formed as cams and adapted to engage the inner ends of one or more pivoted levers 38, 39. The operation of the two levers is very similar to that of the two levers in the preferred design; 39 is the release lever and 38 is the clutch lever. Levers 38 and 39 are both pivoted on the gyroscope casing. The dotted lines on Fig. 9 show the clearance space for the interrupting vanes 36, 36' and the clearance space for the compass shutters. Normally, however, the compass shutter extends from each through south to west and the clutch levers are shown at north. The clearance is necessary in order that the magnetic element will not be fouled under any condition. The tubes 43 are extensions on the air jet ports to allow clearance between the interrupting vanes and the upper part of lever 38.

As the cam disc rotates, lever 39 drops first and 38 next, 39 releasing and 38 clutching the magnetic element. Levers 38 and 39 are operated by springs 44 and 45 respectively, the springs holding lever 38 engaged to the magnetic element and holding lever 39 disengaged.

In Fig. 11 the cam is shown in position 4½. At position 1 neither lever has made contact with the cam surface. The magnetic element is clutched by lever 38. At position 2, lever 39 has been operated and both levers clutch the magnetic element. At position 3 lever 38 has been operated leaving only lever 39 clutching the magnetic element. At position 4, lever 39 falls off the end of the cam releasing the magnetic element. At position 5, lever 38 falls off the end of the cam, clutching the magnetic element.

Another form of my invention is shown in Fig. 12. In this embodiment the gyroscope spins on a north-south horizontal axis. The gyroscope case has three degrees of freedom provided by vertical ring 51 and horizontal ring 52 pivoted therein at 52'. The gyroscope axis is stabilized horizontal by air jet discharged from tube 23 and an opposite air jet, not shown, as in Fig. 1, both controlled by pendulum 54, and is maintained in a north-south direction by air jets 55 and 56, controlled by the magnetic element 57. The average position of the axis of the magnetic element is maintained in the north-south vertical plane by the pendulosity of the gyroscope case about the axis of bearings 58 and 59.

The center of gravity of gyroscope, gyroscope case and horizontal ring assembly is on the line between the bearings connecting the horizontal ring to the vertical ring. The bearings connecting the gyroscope case to the horizontal ring are elevated by a vertical distance 52', 59, making the gyroscope case pendulous about the north-south horizontal axis. Horizontal accelerations in an east-west direction will cause the gyroscope case to tilt to the east or west carrying the magnetic element with it. This tilting of the magnetic element axis to the east or west will cause the element to swing off the true magnetic north, but the gyroscope will follow only slowly and will indicate the average position of the magnetic element.

It will be seen that swinging of the gyroscope case about the axis 58, 59 will raise and lower the center of gravity slightly. The center of gravity of the gyroscope case and horizontal gimbal ring assembly should be placed with respect to the axis 52', so that with average swinging of the gyroscope case about the axis 58—59, the gyroscope case and horizontal gimbal ring assembly will be effectively non-pendulous about the axis 52'. That is, when the gyroscope case swings with an average amplitude about the axis 58—59, the center of gravity of the gyroscope case and horizontal gimbal ring assembly will be on part of the swing below the axis 52' and on part of the swing above the axis 52'.

Fig. 13 shows another form which my invention may take. The gyroscope spins on a north-south horizontal axis. It has only two degrees of freedom, provided by vertical ring 71, the attitude of the gyroscope case in the plane perpendicular to the gyroscope axis being rigidly controlled by the attitude of the craft on which the instrument is mounted. The gyroscope axis is stabilized horizontal by air jet 72 and an opposite air jet not shown, controlled by pendulum 73 and is maintained in a north-south direction by air jets 74 and 75 controlled by magnetic element 76. The magnetic element, a south view of which is shown in Fig. 14, is a single pivot element. The magnets 76 and 77 are shown mounted as low as possible on the spider assembly so as to keep the center of gravity of the element below the point of support. Magnet 77 is mounted on the bottom edge of the spherically shaped vane 78. Magnet 76 is held by support 79 extending from the east edge of the spider assembly. The cage 80 prevents the magnetic element pivot 81, falling out of cup jewel 82, in case the gyroscope case should be turned upside down.

Since the line between the centers of air ports 74 and 75 passes through the point of support of the magnetic element, the attitude of the gyroscope case in a plane perpendicular to the gyroscope spin axis does not affect the proper covering and uncovering of the air ports by vane 78. Neither does tilting of the gyroscope case to the north or south affect the proper covering of the air ports. It is desirable, however, to maintain the gyroscope axis approximately horizontal by the pendulum air jet control provided. Accelerations in an east-west direction will cause the magnetic element to be pulled off the true magnetic direction by the vertical magnetic field, but the gyroscope will follow these fluctuations slowly, indicating always the average position of the magnetic element, which, because of its single-pivot mounting will normally stand with its axis vertical irrespective of departure of the gyro-axis from true horizontal, thus normally immunizing the instrument to the effect of dip of the earth's magnetic field.

In accordance with provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

The invention described herein may be manufactured and/or used by or for the Government of the United States of America for governmental purposes without the payment of any royalties thereon or therefor.

Having described my invention, what I claim and desire to secure by Letters Patent is:

1. In a gyro magnetic compass, the combination with a directional gyroscope having a gyro rotor casing, of a magnetic element pivotally mounted thereon, a source of power controlled by relative turning of said element and casing for causing the spin axis of said gyroscope to follow the average position of said element, means for periodically clutching and unclutching said element and gyroscope, and means operated in timed relation to said first means for synchronously rendering operative and inoperative said source of power.

2. A gyro magnetic compass as claimed in claim 1 in which the period of operation of said clutching means corresponds to a quarter of the period of oscillation of the magnetic element.

3. In a follow-up control for magnetic compasses, the combination with the magnetic element, a following element having opposed air ports therein, means on the magnetic element for differentially covering said ports upon relative turning of said two elements whereby an unbalanced couple is applied to said follow-up element, means for periodically clutching and unclutching said two elements, and means for simultaneously releasing and cutting off the air supply to said ports.

4. In a follow-up control for magnetic compasses, the combination with the magnetic element, a following element having opposed air ports therein, means on the magnetic element for differentially covering said ports upon relative turning of said two elements whereby an unbalanced couple is applied to said follow-up element, and a cam disc for periodically clutching and unclutching said two elements and releasing and simultaneously cutting off the air supply to said ports.

5. In a gyro magnetic compass, the combination with a directional gyroscope having a gyro rotor and casing, of a magnetic element pivotally mounted thereon, a source of power brought into action by relative turning of said element and casing for causing said gyroscope to follow the average position of said element, a cam disc slowly rotated from said rotor, and means operated by said cam for periodically clutching and unclutching said element and gyroscope and for rendering operative and inoperative said source of power in timed relation to said clutching means.

6. In a gyro magnetic compass, a gyro rotor, a bearing support in which said rotor is journalled for spinning about a horizontal axis, a gimbal ring in which said support is pivoted for oscillation about an axis parallel to said first axis and above the center of gravity of the support and gyro-rotor assembly, whereby the support and gyro-rotor are pendulous with respect to said ring, a vertical ring in which said gimbal is pivoted in a horizontal axis at right angles to said second axis, a magnetic element pivotally mounted in upper and lower bearings on said support, and power means controlled by the relative position in azimuth of said support and magnetic element for maintaining the spin axis of the gyroscope normally parallel to the direction of said element.

7. In a gyro magnetic compass, the combination with a directional gyroscope having a gyro rotor support, of a magnetic element pivotally mounted thereon with a single pivot and having a depending skirt extending substantially half way around the same, whereby the magnetic element may stand with its axis vertical irrespective of departures of the gyro-axis from true horizontal, thus preventing dip of the earth's magnetic field from creating turning moments about the said axis of the magnetic element, said support being provided with opposed apertures adjacent the ends of said skirt and positioned to be differentially covered and uncovered thereby upon relative rotation between said gyroscope and magnetic element, and means for causing an air flow therethrough.

8. A gyro magnetic compass comprising a rotor the spin axis of which operates normally on a horizontal, magnetic north-south axis, a rotor bearing support therefor, means for pendulously suspending said support about a magnetic north-south axis above said spin axis, a magnetic element mounted on said support in upper and lower bearings, means controlled by said magnetic element for maintaining the gyroscope spin axis in the magnetic north-south direction, and pendulum controlled means for maintaining the gyroscope spin axis in an approximately horizontal direction.

9. A gyromagnetic compass comprising a gyro rotor, a rotor bearing support on which said rotor is journalled to spin on a normally horizontal magnetic north-south axis, a horizontal gimbal ring in which said rotor and support are pendulously pivoted about a normally horizontal, magnetic north-south axis, a vertical gimbal ring in which said horizontal gimbal ring is pivoted about a normally horzontal magnetic east-west axis, said vertical ring being pivoted about an axis parallel to the vertical axis of the instrument, a magnetic needle pivotally mounted on said rotor bearing support for movement about a normally vertical axis, and means responsive to relative turning of said needle and support in azimuth for applying a torque on the gyro rotor about its horizontal east-west axis to precess the spin axis of said rotor toward parallelism with the average position of said magnetic needle.

10. A gyromagnetic compass comprising a gyroscope including a gyro rotor, a rotor bearing support on which said rotor is journalled on a normally horizontal spin axis, and a vertical ring in which said rotor bearing support is pivoted about a normally horizontal axis at right angles to said spin-axis, said vertical ring being pivoted on a normally vertical axis, a magnetic compass element mounted on said rotor bearing support by means of a single pivot whereby tilting of the rotor bearing support does not cause tilting of the vertical axis of the magnetic compass element and thus does not cause turning of the magnetic element under influence of dip of the earth's magnetic field, and a source of power rendered effective upon relative displacement in azimuth of said magnetic element and gyroscope to cause the gyroscope to follow the average position of said magnetic element.

11. In a gyromagnetic compass, a gyroscope including a gyro rotor and horizontally and vertically pivoted gimbal rings supporting said rotor, a single-pivot type magnetic compass element mounted on one of said gimbal rings, and means responsive to relative turning in azimuth of said magnetic compass element and the gimbal ring upon which it is mounted to cause said gyroscope to follow the average position of said element; whereby substantial immunity from the effect of dip of the earth's magnetic field is achieved.

12. A gyromagnetic compass comprising an air-driven gyroscope including a gyro rotor and members comprising a frame carrying horizontally and vertically pivoted gimbal rings supporting said rotor, a single-pivot type magnetic compass element mounted on one of said members, air jet means carried by one of said gimbal rings positioned to apply a precessing torque to said gyroscope and means carried by said single pivot type magnetic element for controlling said air jet means to cause the gyroscope to follow the average position of said magnetic element; said single-pivot magnetic compass rendering the whole gyromagnetic compass substantially immune from the effect of dip of the earth's magnetic field.

13. In a gyro-magnetic compass, a gyro-rotor, a rotor bearing support in which said rotor is journaled for spinning about a horizontal axis, a horizontal gimbal in which said support and rotor assembly is pendulously pivoted for oscillation about an axis parallel to and above said first axis, a vertical gimbal in which said horizontal gimbal is pivoted in a third horizontal axis at right angles to said second axis and passing through the center of gravity of the rotor, rotor-support and horizontal gimbal assembly, a magnetic element pivotally mounted on said support, and means responsive to relative displacement of said element and gyroscope to cause said gyroscope to follow the average position of said element.

14. In a gyro-magnetic compass in combination a directional gyroscope having a gyro-rotor support, a magnetic element pivotally mounted thereon on a single pivot providing limited universal tilting movement of said element, said element having a depending skirt of a section of a sphere in form and extending substantially half way around the same, said support having opposed apertures positioned to be differentially covered and uncovered by the end edges of said skirt upon relative rotation between said gyroscope and element and means for causing an air flow through said apertures whereby control of air flow through said apertures is uniformly affected regardless of tilting of said element on its single pivot point.

JOHN B. PETERSON.